Nov. 19, 1957  S. A. STANILOFF  2,814,008
MOTOR SPEED REGULATION
Filed Feb. 2, 1956  2 Sheets-Sheet 1

INVENTOR.
S. STANILOFF
BY
*G. D. O'Brien*
*V. C. Muller*
ATTORNEYS

Nov. 19, 1957　　　　S. A. STANILOFF　　　　2,814,008
MOTOR SPEED REGULATION
Filed Feb. 2, 1956　　　　　　　　　　　　2 Sheets-Sheet 2
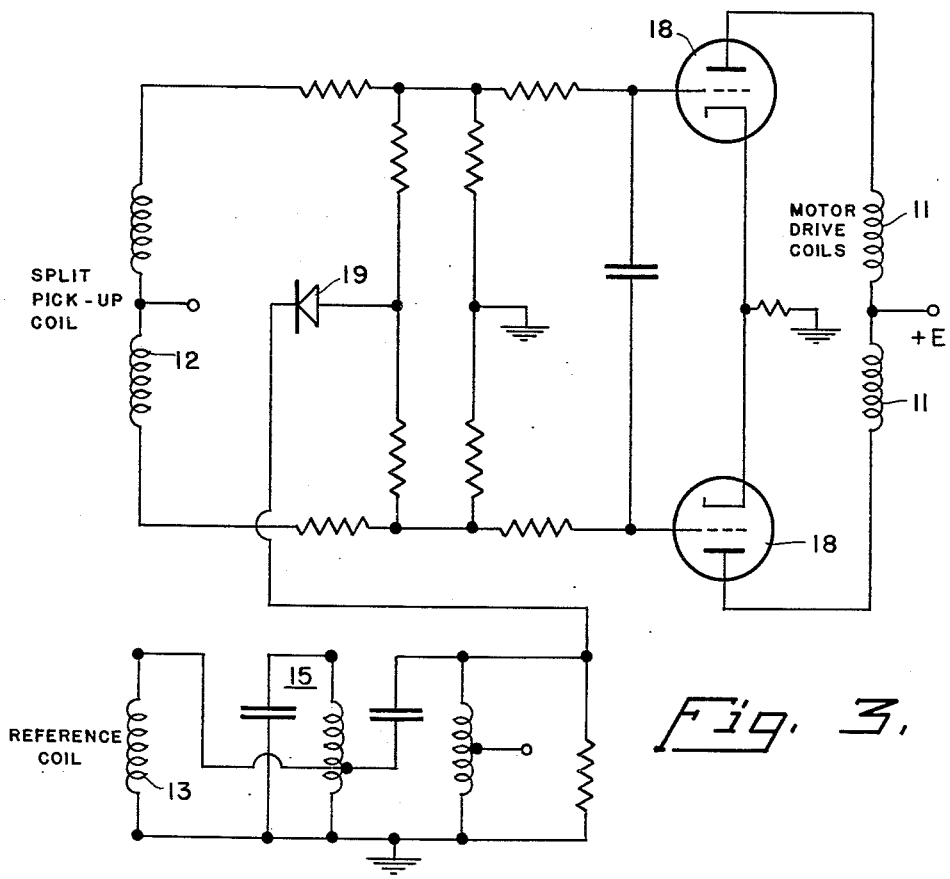
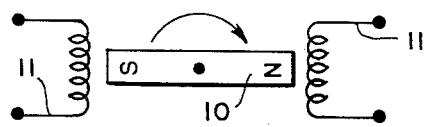
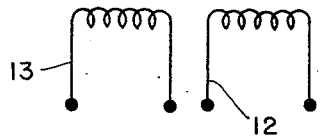
INVENTOR.
S. STANILOFF
BY
ATTORNEYS United States Patent Office 2,814,008
Patented Nov. 19, 1957

2,814,008

MOTOR SPEED REGULATION

Seldon A. Staniloff, Spring Valley, N. Y., assignor, by mesne assignments, to the United States of America as represented by the Secretary of the Navy Application February 2, 1956, Serial No. 563,165

7 Claims. (Cl. 318—138)

The present invention relates to an internal motor drive system and particularly to a constant speed A. C. motor drive arrangement.

The present invention relates to an internal motor drive with certain control characteristics accomplished by passing the motor drive excitation through a sharply tuned filter, amplifying the resultant output voltage with a biased tube and applying this A. C. voltage at the drive grids to block out the original excitation or by converting the output voltage to D. C. and biasing the motor drive tubes to cut-off. Various electrical and electro-mechanical arrangements were used in previous systems, however, they had the disadvantages of relatively high cost, excessive weight and size, and complexity. These disadvantages are overcome by the present arrangement for stabilizing the speed of a motor.

An object of the invention is to provide a constant speed motor drive system.

Another object is to provide a simple and relatively inexpensive electrical system for motor speed regulation.

A further object is to provide an arrangement for stabilizing a motor at a predetermined angular velocity.

Other objects and many of the attendant advantages of this invention will be readily appreciated as the same become better understood by reference to the following detailed description when considered in connection with the accompanying drawings wherein:

Figs. 1 and 2a are simple schematic illustrations of a motor drive arrangement using a rotary magnet, motor drive coils and a pick-up coil;

Figs. 2 and 3 show schematic circuit diagrams of the constant speed motor drive system of the present invention.

Figure 2:
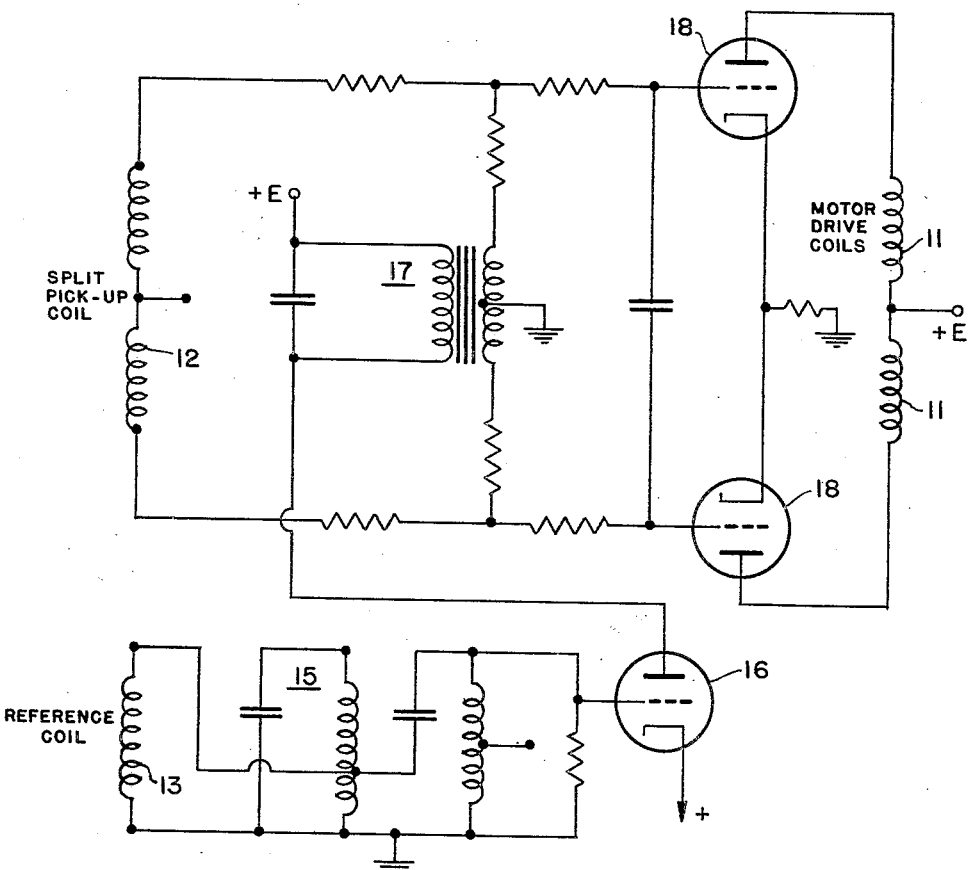
Figure 1:
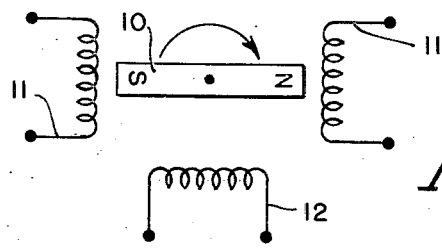

Referring now to the drawings, like reference numerals refer to like parts in the figures. The present invention is for an internal motor drive system of the type, shown in Fig. 1, comprising a rotary magnet 10, motor drive coils 11, and a pickup coil 12 angularly disposed about the axis of rotation of the rotor 10. The pickup coil is spaced at 90 degrees to each of the motor drive windings. When the rotor magnet 10 is rotating, it induces a voltage in the pickup coil 12; this voltage is amplified, shifted in phase, and applied to the motor drive coils 11. Because of the 90 degree space relation between the position of the pickup coil and the motor drive coils, the magnetic field created by the current in the push-pull motor drive coils increases the angular velocity of the magnet. The increased angular velocity of the magnet 10 generates an increased voltage in the pickup coil 12, this increases the drive to an amplifier associated with the motor drive system and, consequently, increases the power applied to the motor drive coils 11. The motor will continue to accelerate until it reaches a stable speed which is dependent on the characteristics of the amplifier, the supply voltages, the mechanical and viscous friction of the system and the like. Because of the random nature of these parameters, the stabilization speed of these different assemblies would ordinarily vary over substantially wide limits. However, in many instances, variation in stabilization speed cannot be tolerated in a motor drive system. The present invention provides an arrangement whereby a motor may be stabilized at a predetermined angular velocity. Referring to Fig. 2, a schematic circuit diagram is shown of the present invention, a magnet 10 as in Fig. 1 not being deemed necessary to illustrate. The voltage induced in the split pickup coil 12 is shifted in phase, amplified, and applied to the motor drive coils 11. To provide for a predetermined stabilization speed, a reference coil 13 is provided mounted in the same position as the pickup coil 12 relative to the motor drive coils 11. The relative positions of the coils 11, 12 and 13 of Fig. 2 to the rotor and each other are shown in Fig. 2A. The voltage induced in the reference coil 13 by a rotating magnet, such as in Fig. 1, is passed through a sharply tuned filter circuit 15, and applied to the grid of the biased tube 16. The amplified output of tube 16 is fed to a parallel resonant circuit 17 and inductably coupled to the drive grids of the motor drive amplifiers 18 to block out the original signal. The arrangement is such that the filter circuit 15 is tuned to the frequency generated by the rotating magnet at the desired stabilization speed, whereby when the motor reaches such speed the amplified output of the filter circuit will be 180 degrees out of phase with and equal in amplitude to the orginial excitation applied to the motor drive coil grids from the pickup coil so that no voltage will be applied to the motor drive coils.

In an alternate arrangement, see Fig. 3, the output of the tuned filter circuit 15 may be rectified by means of rectifier 19 and applied to the amplifier drive grids, the arrangement being such that the drive tubes 18 will be biased to cut off when the stabilization speed is reached.

Obviously, many modifications and variations of the present invention are possible in the light of the above teachings. It is therefore to be understood that within the scope of the appended claims the invention may be practiced otherwise than as specifically described.

What is claimed is:

1. An arrangement for stabilizing the speed of an electric motor at a predetermined angular velocity comprising a motor having a rotor magnet, motor drive coils, a motor pickup coil whose induced voltage is applied to said motor drive coils for driving said rotor magnet of the motor and a reference coil which is fixedly located in the same relative position as said motor pickup coil proximate to said rotor magnet, said reference coil adapted to have a voltage induced therein by said rotor magnet, a tuned filter circuit coupled to the output of said reference coil motor drive coils amplifiers, the output of said filter circuit being amplified and coupled to said motor drive coils amplifiers together with the output of said pickup coil, said arrangement being such that when said filter circuit is tuned to a predetermined frequency of rotation of said magnet, the output of said filter circuit will block the original signal applied to said motor drive coils from the pickup coil at the predetermined frequency whereby to cause said motor speed to stabilize at such frequency.

2. An arrangement for stabilizing the speed of an electric motor at a predetermined angular velocity comprising a motor having a rotor magnet, motor drive coils, a pick-up coil whose induced voltage is applied to said motor drive coils for driving said rotor magnet of the motor and a reference coil which is fixedly located in the same relative position as said motor pickup coil proximate to said magnet, said reference coil adapted to have a voltage induced therein by said rotor magnet, a filter means coupled to the output of said reference coil, motor drive coils amplifiers, the output of said filter means being applied to the grids of said motor drive coils amplifiers, said filter means being tuned to a predetermined frequency of rotation of said rotor magnet whereby said amplifiers are biased to cut off when the rotor magnet reaches said predetermined angular velocity and said rotor magnet is caused to stabilize at said angular velocity.

3. In an arrangement for stabilizing, at a predetermined angular velocity, the speed of a motor of the type including a rotating magnet, a pair of push-pull electromagnetic motor drive coils fixedly mounted proximate to said rotating magnet, and a pickup coil angularly spaced from said drive coils, and wherein the voltage induced in said pickup coil by said rotating magnet is shifted in phase, amplified, and applied to said drive coils for driving said magnet in rotation, the improvements comprising a reference coil which is fixedly located in the same position as said pickup coil relative to said rotating magnet and adapted to have a voltage induced therein by said rotating magnet, a tuned filter circuit coupled to the output of said reference coil, drive coils amplifiers, the output of said filter circuit being amplified, rectified, and applied to the grids of the drive coils amplifiers, said filter circuit being tuned to a predetermined frequency of rotation of said magnet whereby to bias said amplifiers to cut off when the magnet reaches said predetermined angular velocity and cause the magnet to stabilize at said angular velocity.

4. A device as in claim 3 wherein said pickup coil is angularly spaced at 90° from each of said motor drive coils about the axis of rotation of said rotating magnet.

5. In an arrangement for stabilizing, at a predetermined angular velocity, the speed of a motor of the type including a rotating magnet, a pair of push-pull electromagnetic motor drive coils fixedly mounted proximate to said rotating magnet, and a pickup coil angularly spaced from said drive coils, and wherein the voltage induced in said pickup coil by said rotating magnet is shifted in phase, amplified, and applied to said drive coils for driving said magnet in rotation, the improvements comprising a reference coil which is fixedly located in the same position as said pickup coil relative to said rotating magnet and adapted to have a voltage induced therein by said rotating magnet, a tuned filter circuit coupled to the output of said reference coil, drive coils amplifiers, the output of said filter circuit being amplified and coupled to the grids of the motor drive coils amplifiers together with the output of said pickup coil and having 180 degrees phase relationship therewith, the arrangement being such that when said filter circuit is tuned to a predetermined frequency of rotation of said magnet, the output of said filter circuit will block the original signal applied to said drive coils from the pickup coil at the predetermined frequency whereby to cause said motor speed to stabilize at such frequency.

6. A device as in claim 5 wherein said pickup coil is angularly spaced at 90° from each of said motor drive coils about the axis of rotation of said rotating magnet.

7. A system for stabilizing the speed of an electric motor of the type including a rotor magnet, a pair of electromagnetic motor drive coils and a pickup coil spaced about and proximate to said rotor magnet, and wherein the voltage induced in the pickup coil by said rotor magnet is applied to said motor drive coils for driving said rotor magnet in rotation, the improvements comprising means located in the same position as said pickup coil relative to said rotor magnet and adapted to have a voltage induced therein by the rotation of said rotor magnet, a filter circuit coupled to the output of said means, motor drive coils amplifiers, the output of said filter circuit being applied to the grids of the motor drive coils amplifiers, said filter circuit being tuned to a predetermined frequency of rotation of said magnet whereby said amplifiers are biased to cut off when the rotor magnet reaches said predetermined angular velocity and cause the rotor magnet to stabilize at said angular velocity.

References Cited in the file of this patent

UNITED STATES PATENTS

| | | |
|---|---|---|
| 2,006,935 | Wolf | July 2, 1935 |
| 2,039,869 | Adler | May 5, 1936 |
| 2,719,944 | Brailsford | Oct. 4, 1955 |